US010621786B2

(12) United States Patent
Shantharam et al.

(10) Patent No.: US 10,621,786 B2
(45) Date of Patent: Apr. 14, 2020

(54) GENERATING A VIRTUAL WALL IN AN AUGMENTED REALITY ENVIRONMENT TO SIMULATE ART DISPLAYS

(71) Applicant: Walmart Apollo, LLC, Bentonville, AR (US)

(72) Inventors: Nitin Shantharam, San Francisco, CA (US); Christin Chi, Oakland, CA (US); Patrick John Kelleher, Oakland, CA (US); Ravi Theja Karnatakam, Fremont, CA (US); Christine Torrefranca Fernandez, Oakland, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/872,905

(22) Filed: Jan. 16, 2018

(65) Prior Publication Data
US 2019/0221040 A1 Jul. 18, 2019

(51) Int. Cl.
*G06T 19/00* (2011.01)
*G06F 3/0484* (2013.01)
*G06K 9/00* (2006.01)
*G06F 3/0488* (2013.01)
*G06Q 30/06* (2012.01)
*G06F 3/0481* (2013.01)

(52) U.S. Cl.
CPC ........ *G06T 19/006* (2013.01); *G06F 3/04815* (2013.01); *G06F 3/04845* (2013.01); *G06F 3/04883* (2013.01); *G06K 9/00671* (2013.01); *G06Q 30/0641* (2013.01); *G06F 2203/04802* (2013.01)

(58) Field of Classification Search
None
See application file for complete search history.

(56) References Cited

U.S. PATENT DOCUMENTS

| | | |
|---|---|---|
| 2,291,257 A | 7/1942 | Rider |
| 5,743,407 A | 4/1998 | Williams |
| 6,572,377 B2 | 6/2003 | Masters |
| 7,661,958 B2 | 2/2010 | Meyer |
| 8,239,840 B1 | 8/2012 | Czymontek |
| 8,593,478 B2 | 11/2013 | O'Brien |
| 9,351,594 B2 | 5/2016 | Mehra |
| 2002/0116365 A1 | 8/2002 | Kusin |
| 2003/0200131 A1 | 10/2003 | Gabbert |

(Continued)

OTHER PUBLICATIONS

Magicplan, "Magicplan 4.0", https://www.youtube.com/watch?v=1_VvmZFr_Xg, Jan. 2, 2017.*

(Continued)

*Primary Examiner* — Nicholas R Wilson
(74) *Attorney, Agent, or Firm* — Patterson Thuente Pedersen, P.A.

(57) ABSTRACT

The disclosed teachings disclose a method, apparatus, and system for generating a virtual wall in an augmented reality (AR) environment to simulate art displays. In particular, an AR environment may be generated based upon data representing the physical environment. Additionally, virtual artwork may be positioned on a virtual wall corresponding to a physical wall in the physical environment. The AR environment may further facilitate the selection, modification, and purchase of the simulated artwork.

15 Claims, 10 Drawing Sheets

(56) References Cited

U.S. PATENT DOCUMENTS

| | | |
|---|---|---|
| 2005/0231511 A1 | 10/2005 | Doepke |
| 2006/0085277 A1 | 4/2006 | Arnston |
| 2007/0111178 A1 | 5/2007 | Riley |
| 2007/0143082 A1 | 6/2007 | Degnan |
| 2008/0018665 A1 | 1/2008 | Behr |
| 2008/0228599 A1 | 9/2008 | Webb |
| 2011/0029401 A1 | 2/2011 | Granger |
| 2011/0093361 A1 | 4/2011 | Morales |
| 2012/0026322 A1* | 2/2012 | Malka ............... G01C 11/02 348/142 |
| 2012/0224768 A1 | 9/2012 | Lee |
| 2012/0231424 A1 | 9/2012 | Calman |
| 2012/0280995 A1 | 11/2012 | Anderson |
| 2012/0297325 A1 | 11/2012 | Ball |
| 2012/0310954 A1 | 12/2012 | Gaikwad |
| 2013/0063418 A1 | 3/2013 | Kaschalk |
| 2013/0073420 A1 | 3/2013 | Kumm |
| 2013/0311925 A1 | 11/2013 | Denker |
| 2013/0326381 A1 | 12/2013 | Pereira |
| 2014/0063063 A1* | 3/2014 | Scott ................. G06T 11/60 345/633 |
| 2014/0289069 A1 | 9/2014 | Bhardwaj |
| 2014/0304265 A1 | 10/2014 | Topakas |
| 2014/0304660 A1 | 10/2014 | Topakas |
| 2014/0304661 A1 | 10/2014 | Topakas |
| 2015/0161822 A1* | 6/2015 | Basu ................. G06F 16/29 345/633 |
| 2015/0177960 A1 | 6/2015 | Topakas |
| 2015/0178315 A1 | 6/2015 | Topakas |
| 2015/0178955 A1 | 6/2015 | Topakas |
| 2015/0317070 A1* | 11/2015 | Lammers Van Toorenburg .......... G06F 3/04842 715/771 |
| 2016/0216096 A1 | 7/2016 | Mehra |

OTHER PUBLICATIONS

Mark Dawson, "ARKit by Example—Part 2: Plane Detection + Visualization" 2017, https://blog.markdaws.net/arkit-by-example-part-2-plane-detection-visualization-10f05876d53. (Year: 2017).*

Application and File History for U.S. Appl. No. 14/639,844, filed Mar. 25, 2015, Inventor: Topakas.

Application and File History for U.S. Appl. No. 14/639,873, filed Mar. 5, 2015, Inventor: Topakas.

Application and File History for U.S. Appl. No. 14/639,880, filed Mar. 5, 2015, Inventor: Topakas.

Application and File History for U.S. Appl. No. 14/030,913, filed Sep. 18, 2013, Inventor: Topakas.

Application and File History for U.S. Appl. No. 14/030,931, filed Sep. 18, 2013, Inventor: Topakas.

Application and File History for U.S. Appl. No. 14/030,967, filed Sep. 18, 2013, Inventor: Topakas.

Application and File History for U.S. Appl. No. 14/668,875, filed Mar. 25, 2015, Inventor: Golding.

* cited by examiner

GENERATING A VIRTUAL WALL IN AN AUGMENTED REALITY ENVIRONMENT TO SIMULATE ART DISPLAYS

TECHNICAL FIELD

The disclosed teachings relate to an augmented reality (AR) environment for mobile devices. The disclosed teachings more particularly relate to methods, devices, and systems for providing an AR environment that simulates artwork on a wall based upon the physical environment captured by the mobile device camera and user input data. The AR environment may further facilitate the selection, modification, and purchase of the simulated artwork.

BACKGROUND

Current tools for simulating artwork in an environment (e.g., simulating the appearance of a painting on a wall) are static. In a static simulation, a user may provide a still photo of an environment where the user desires to place an artwork. Sizing calculations is performed on a still photo of a desired artwork and superimposed on the still photo of the environment. In this way, the static simulation produces a photograph of what the artwork may look like in the desired environment.

One of the problems with the static simulation is that the user is not able to simulate the selected artwork in a desired environment in real-time. The user must wait for sizing calculations to be performed and applied to a selected artwork. Then the selected artwork must be superimposed on the photo of the desired environment. This process requires the user to provide a photo of the environment and then wait for the selected artwork to be sized and superimposed. If the user wishes to adjust the placement of the artwork, change the size of the artwork, or change the selected artwork, then the process must be repeated. If the user wishes the change the perspective of the environment, then the user must supply a different photo of the environment corresponding to the desired perspective and the process must be repeated, thus resulting in further delay.

DETAILED DESCRIPTION

Figure 1:
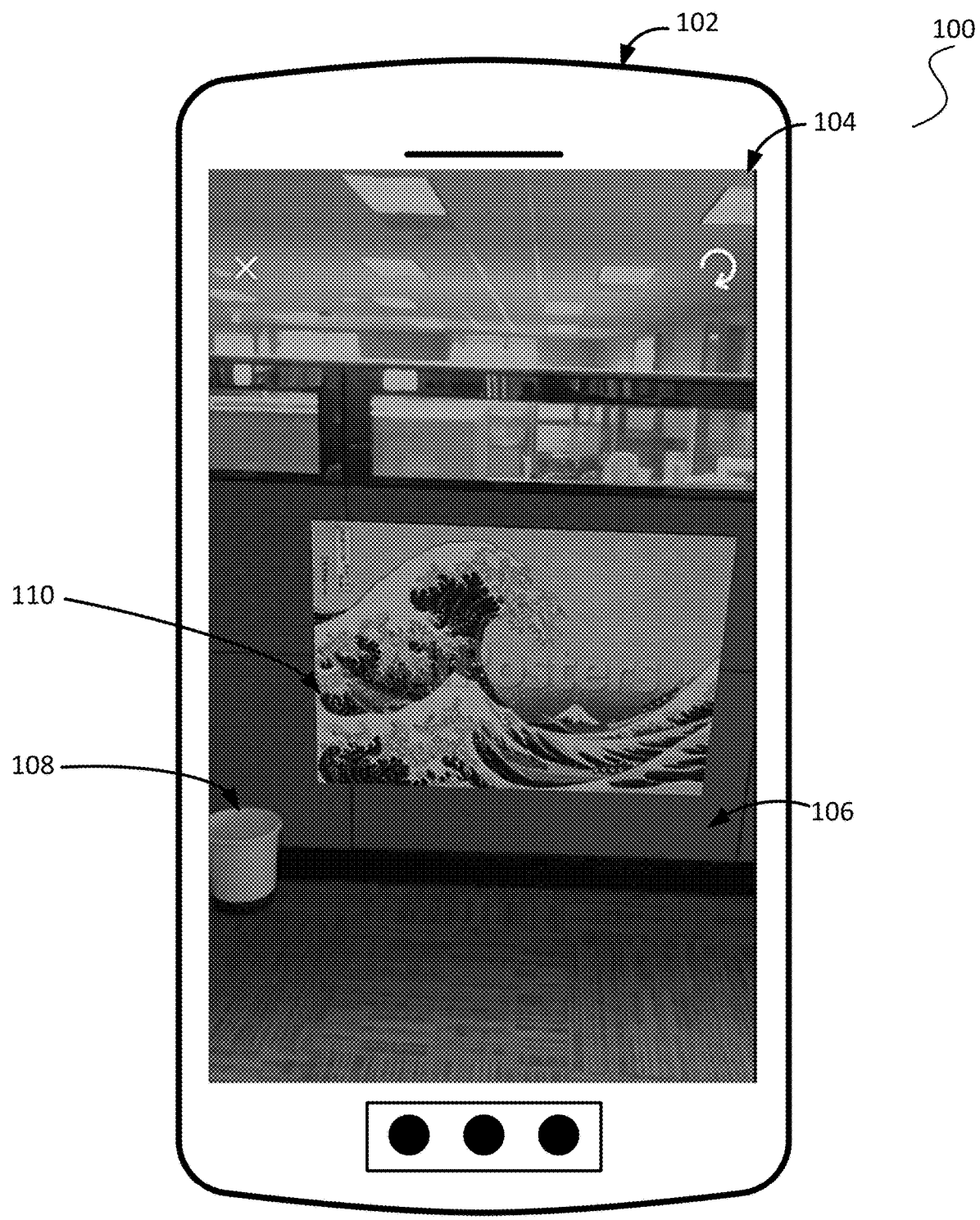
FIG. 1 is a diagram of a mobile device that implements an AR framework according to some embodiments of the present disclosure.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of the concepts that are not particularly addressed herein. It should be understood that these concepts and applications fall within the scope of the disclosure.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like refer to actions and processes of a computer or similar electronic computing device that manipulates and transforms data represented as physical (e.g., electronic) quantities within the computer's memory or registers into other data similarly represented as physical quantities within the computer's memory, registers, or other such storage medium, transmission, or display devices.

AR Environments and Frameworks

Methods, devices, and systems for providing an AR environment to simulate artwork on a wall based upon the physical environment captured by the mobile device sensors and user input are described herein. The AR environment may further facilitate the selection, modification, and purchase of the simulated artwork.

AR environments can be readily generated on mobile devices using frameworks provided by various mobile operating system vendors. For example, Apple™ provides the ARKit™ framework to generate AR environments within the iOS operating system. Similarly, Google™ provides the ARCore™ framework for generating AR environments within the Google Android™ operating system. The ARKit™ framework, ARCore™ framework, and/or any other AR capable framework (the "frameworks") allow applications to generate and display an AR experience that approximates the physical environment in which the mobile device is located. The frameworks use the mobile device's sensors to detect the position, topology, lighting, and other conditions of the environment. The sensors may include motion sensors and cameras on the mobile device.

Using the sensor data, the frameworks produce an AR environment that blends the detected physical characteristics (e.g., the location and distance of physical elements detected by the mobile device camera) with virtual data that exists only within the AR environment. Described in another way, the AR environment is a combination of the virtual representation of the detected physical environment and an overlay that adds additional data over the virtual representations. The result is a user experience that combines the physical world where in the mobile device exists and the digital world represented by the AR environment.

For example, an AR environment may include a horizontal plane based on the physical floor captured by the real-time images from a camera on the mobile device. The user of the mobile device may identify and mark the boundaries of spaces in the environment within the AR environment. The mobile device may record the marked boundaries to generate an AR representation of an environment. The mobile device may combine the real-time camera input and user input to generate a floor plan of a building. The AR representation may be used to measure the space and plan the layout of a floor plan. Additionally, the AR representation may be used to simulate elements placed within the AR environment. The element may be adjusted (e.g., different sizes or positions) within the AR environment to determine to desired characteristics.

AR Framework Features

One feature of the frameworks is that the AR environment is generated and updated in real-time by using real-time sensor data from the mobile device. For example, as the user of the mobile device moves around the physical space, the camera on the mobile device will capture visual input representing the shifting perspective of the user. Additionally, as the user of the mobile device shifts the direction or orientation of the mobile device, the motion sensor will detect the change and adjust the AR environment to reflect the change in direction or orientation of the mobile device. This flow of real-time sensor data can be used to continually update the AR environment generated within the mobile device to constantly reflect the experience of the user in the physical space. In other words, the virtual representation of the physical environment is continually updated in real-time to reflect the detected conditions of the physical environment.

Another feature of the frameworks is the ability to detect horizontal planes. The camera and motion sensor continuously gather visual data and motion data, respectively. For example, a user may point a mobile device camera at a floor and slowly pan upwards. As the camera starts by pointing at the floor, the distance between the camera and the point of the floor where the camera is pointing is closest. As the camera pans upwards towards the horizon, the distance from the camera to the point of the floor where the camera is pointing increases. Additionally, the motion sensors on the mobile device will detect the shift in orientation of the mobile device from pointing downwards to pointing in a horizontal direction. Using the sensor data, the frameworks can determine the horizontal plane. Additionally, the frameworks can use the detected horizontal plane to generate a corresponding virtual horizontal plane in the AR environment.

An additional feature of the frameworks is the ability to calculate the distance from the mobile device to points on the detected horizontal planes. For example, a user may mark or select a point on the horizontal plane in the AR environment. The frameworks provide a distance value representing the distance between the location of the mobile device and the point the user marked in the AR environment. For example, if the user marks a point on the lower part of the screen representing a location near where the user is standing, the distance value will be relatively small. However, if the user marks a point on the upper part of the screen representing a location farther from where the user is standing, the distance value will be relatively large.

A feature of the frameworks is the ability for users to interact with the AR environment. For example, the generated AR environment may be displayed on a touchscreen display of the mobile device. The user may interact with the AR environment by providing inputs via the touchscreen capabilities of the display. The user may touch screen to select elements within the AR environment. The user may also swipe the screen to shift the perspective, orient a selected element, or change the characteristic of the selected element. Additionally, the framework allows users to touch a part of the screen to mark or place virtual elements within the AR environment. This element is placed in the corresponding physical coordinates of the AR environment. For example, if the user taps the portion of the screen that displays a corner of the floor in the AR environment, then the user marks the corner location of the floor. If a user swipes the portion of screen representing a side of the floor, then the user marks the side of the floor. In some embodiments, different gestures and taps may be used to interact with the AR environment using the touch screen of the mobile device. In yet other embodiments, additional input interfaces such as hardware buttons, sound commands, or facial recognition may be used to interact with the AR environment.

FIG. 1 is a diagram of a mobile device 102 that implements an AR framework to provide an AR environment according to some embodiments of the present disclosure. The mobile device 102 receives data related to the physical space occupied by the mobile device using sensory input. In some embodiments, the mobile device 102 may include sensors such as a microphone, motion sensor, light sensor, camera or other optical sensor. Those skilled in the art will recognize that additional sensors may be used to receive sensory input indicating the physical environment occupied by the mobile device. The mobile device includes a display 104 that displays an AR environment. In some embodiments, the AR environment may be provided by a mobile application running on the mobile device. The AR environment includes representations of physical elements in the physical space occupied by the mobile device and detected by the mobile device sensors. For example, the AR environment includes a representation of a divider wall 106 and garbage container 108 detected by the mobile device camera.

Additionally, the AR environment may include elements that are not from the physical space. For example, the AR environment may include a virtual artwork 110. This virtual artwork 110 may have been preselected by the mobile device user. The AR environment may superimpose the virtual artwork 110 over the representations of physical elements in the physical space such as the wall divider 106. In some embodiments, the AR environment may be a live view of the environment. Therefore, when the sensors detect a change in the condition of the environment, the AR environment will update in real-time to reflect the changed condition. For example, if the mobile device is shifted such that the camera is pointed to a new physical area, the AR environment will also shift to show the digital representation of the new area.

Figure 2:
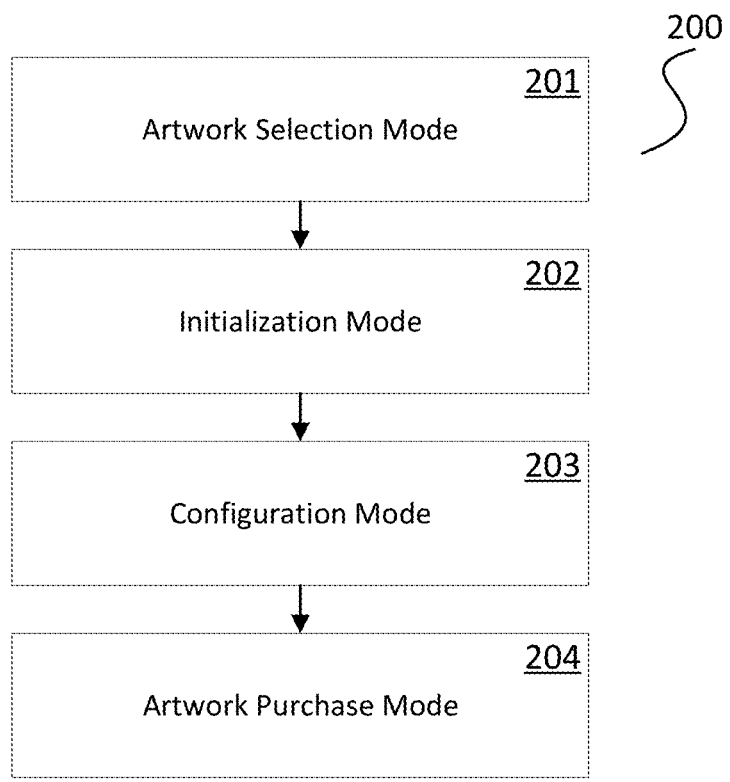
FIG. 2 is a flow diagram of a process for presenting various graphical user interface (GUI) elements in a computing device according to some embodiments of the present disclosure.

FIG. 2 depicts a flow diagram of process 200 for presenting various GUI elements in a computing device. In some embodiments, the GUI elements can be presented in display 104 of mobile device 102. The GUI elements may be presented in a manner that allows a user to select desired artwork, receive instructions for configuring an AR environment, configure the AR environment, and purchase the selected artwork. In step 201, process 200 displays an artwork selection GUI. The artwork selection GUI 201 may present a preview of various artwork for the user to select. The various artwork may be stored on the mobile device or obtained from a server connected the mobile device via a data network. In some embodiments, the artwork selection GUI 201 may be implemented as selection GUI 300 of FIG. 3.

In step 202, process 200 displays an initialization GUI. The initialization GUI may be present instructions for the user on how to configure the AR environment. Additionally, the initialization GUI may include an option to enter a configuration mode. In some embodiments, the initialization GUI may be implemented as GUI 400 of FIG. 4.

In step 203, the user enters configuration GUI from the initialization GUI, to allow a user to input data about the physical environment. In some embodiments, the user input may indicate the location of a physical wall. In some embodiments, the configuration GUI may be implemented as GUI 500 of FIG. 5.

In step 204, process 200 displays purchase GUI. The purchase GUI allows the user to view a virtual artwork on the virtual wall configured in configuration GUI. The purchase GUI also allows the user to choose assorted options for purchasing a physical copy of the virtual artwork. In some embodiments, the purchase GUI may be implemented as GUI 600 of FIG. 6. A person skilled in the art will appreciate that the various GUI elements may be presented in different sequences and that the user may move back and forth between the various GUI elements.

Figure 3:
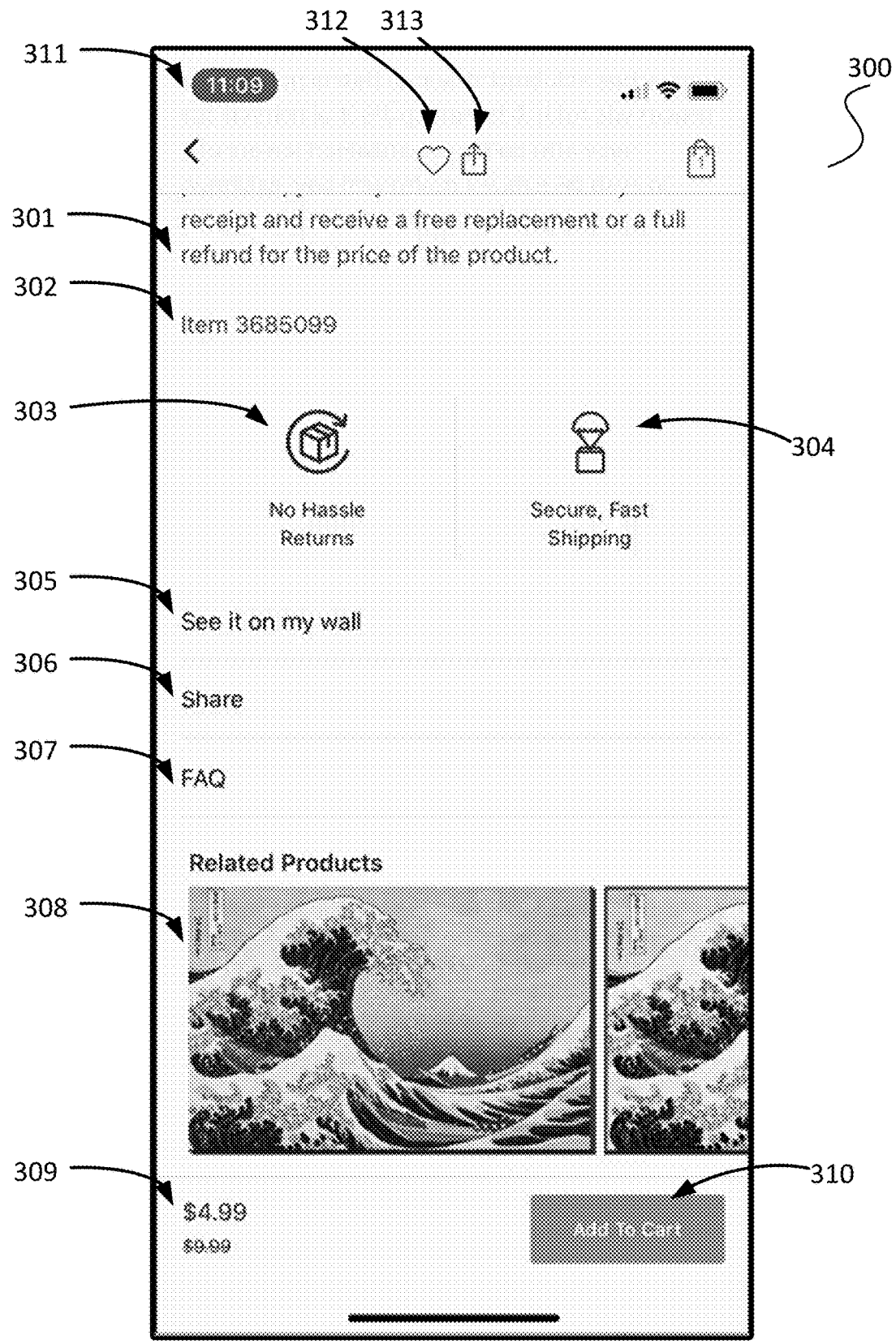
FIG. 3 is a diagram of a GUI for selecting artwork according to some embodiments of the present disclosure.

FIG. 3 is a diagram of GUI 300 that provides an interface for selecting artwork according to some embodiments of the present disclosure. In some embodiments, selection GUI 300 may be implemented as a mobile application running on mobile device 102. Generally, selection GUI 300 is an interface that allows users to explore and select artwork for simulation in the AR environment.

Selection GUI 300 may include a description section 301 that provides details about the artwork being viewed. There may also be an item number section 302 that displays the item number identifying the artwork being viewed. In some embodiments, selection GUI 300 includes fulfillment icons 303 and 304 that describe the return policy and shipping options of the artwork, respectively. Selection GUI 300 may also include buttons 305, 306, and 307. Button 305 allows a user to preview the selected artwork on the wall in the AR environment. Button 306 allows a user to share the artwork. In some embodiments, the option provides a hyper-link to artwork viewable by a web browser. In other embodiments, the share may generate entries for posting in a social network or mobile application. Button 307 allows a user to view frequently asked questions regarding the artwork.

Finally, selection GUI 300 also provides a related artwork section 308 that displays related products or artworks. For example, the related artworks section 308 may display artworks from the same genre, time period, or similar artists. The price information section 309 may present pricing information such as the current price, the previous price, and/or the list price. The add to cart button 310 allows the user to add the currently viewed artwork into a shopping cart for checkout.

In some embodiments, selection GUI 300 also includes a timing section 311. The timing section 311 may display the remaining time when the artwork is available, the remaining time when a special offer is available, or the amount of time the user has viewed the artwork. The favorites button 312 and export button 313 provides additional browsing functionality to the user. For example, the favorites button 312 marks the current artwork as a favorite artwork. The user may later browse all the artwork that have been marked as a favorite. The export button 313 allows the user to export the currently viewed artwork page to another mobile device, onto a clipboard for use by the user, or for posting on a social network. Those skilled in the art will understand that selection GUI 300 may contain some or all of the buttons and control elements described above. Additionally, GUI 300 may be configured to include additional control elements that provide added functionality that facilitates the selection of artwork for simulation and purchase.

Figure 4:
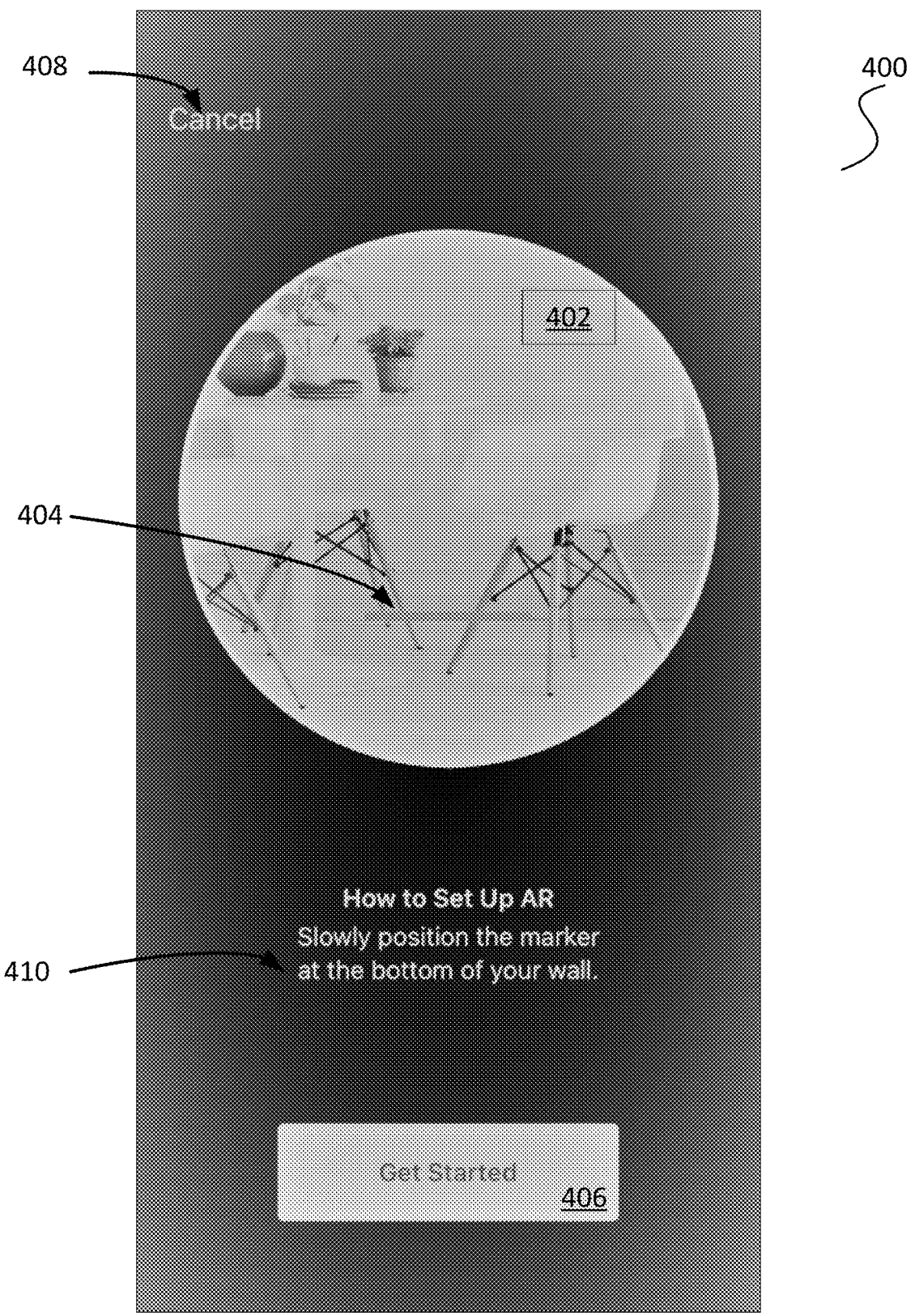
FIG. 4 is a diagram of a GUI for launching the AR environment configuration mode according to some embodiments of the present disclosure.

FIG. 4 is a diagram of a GUI 400 that provides an initial interface for launching the AR environment configuration mode according to some embodiments of the present disclosure. In some embodiments, GUI 400 may be implemented as part of a mobile application running on mobile device 102. Generally, GUI 400 is an introductory screen that allows the user to press a button to begin the configuration step of configuring the AR environment.

GUI 400 may include a display window 402, horizontal marker 404, a start button 406, a cancel button 408, and instructions section 410. The display window 402 may be a static image that demonstrates the general form and appearance of a display window that will appear during the actual configuration step. The horizontal marker 404 may also be part of the static image. Alternatively, the horizontal marker 404 may be an animation showing the marker float across a portion of display 402. The animation may provide users with an indication of how the marker should move and reach the point in the AR environment where the floor meets the wall. In other embodiments, the display window 402 may be a live-view window that displays the virtual representation of the physical environment captured by the mobile device sensors. Here, the horizontal marker 404 may float above the virtual representation of the physical environment. Thus, even as the virtual representation of the physical environment shift, the horizontal marker 404 remains fixed on a point in the display window 402.

The start button 406, when pressed or tapped, starts the configuration step of setting up the AR environment. The cancel button 408, when pressed or tapped, exits the initial screen without starting the configuration step for setting up the AR environment. The instruction section 410 provides directions for setting up the AR environment once the application enters the configuration step. In some embodiments, the instruction section 410 includes directions in the form of texts. In other embodiments, the instruction section 410 may include a combination of text, diagrams, figures, or animations that illustrate how to configure the AR environment.

Figure 5:
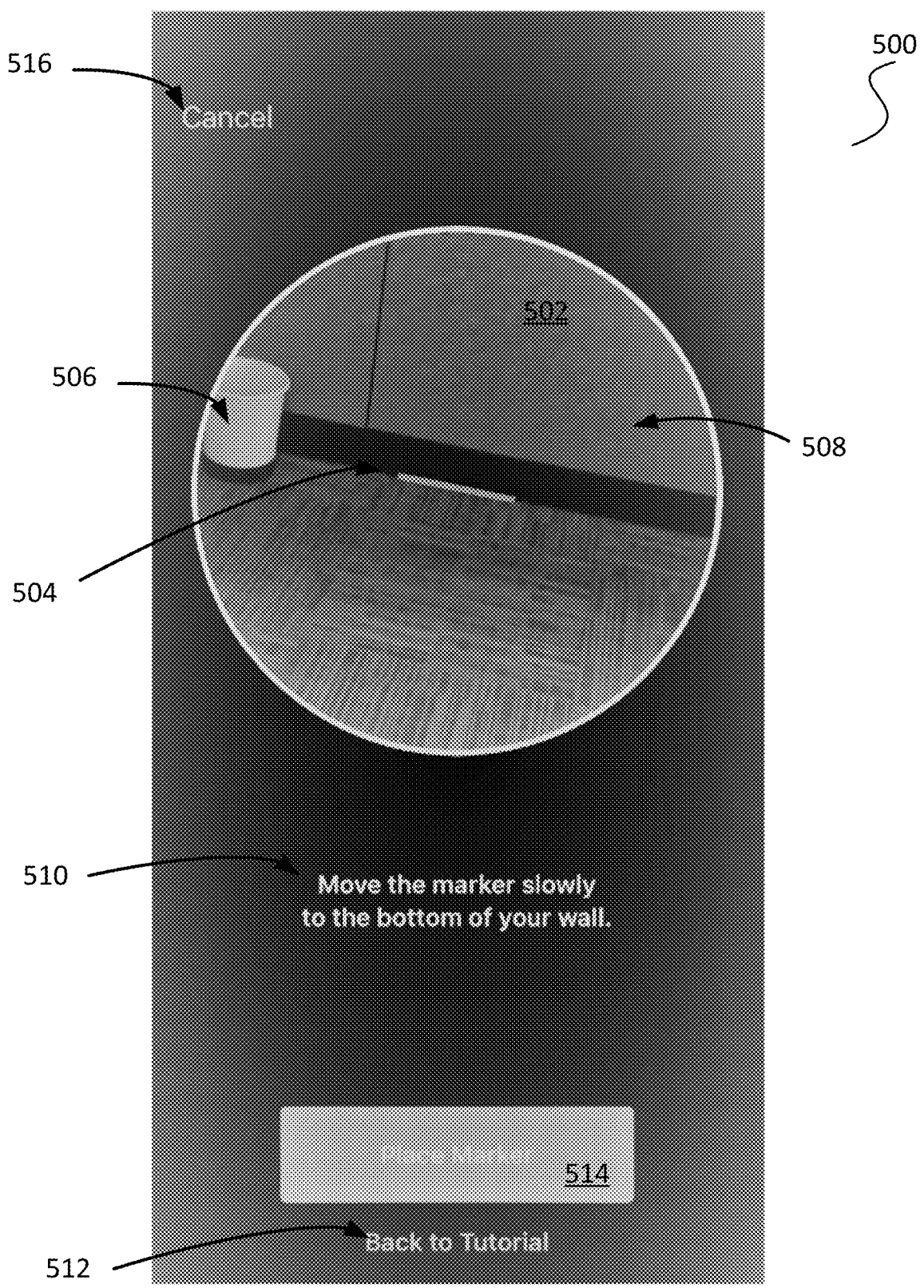
FIG. 5 is a diagram of a GUI for configuring the AR environment according to some embodiments of the present disclosure.

FIG. 5 is a diagram of a GUI 500 for configuring the AR environment according to some embodiments of the present disclosure. The GUI may be provided as a part of a mobile application running on mobile device 102. The GUI includes a display window 502 that displays the AR environment. As described above, the AR environment may include a combination of virtual representations of the detected physical environment and an overlay that adds additional data over the virtual representations. Additionally, the AR environment may be a live view that reflects the detected changes to the physical environment in real-time.

As described above, AR frameworks can detect a horizontal plane such as the physical floor. Additionally, the AR frameworks generally can calculate the distance from the location of the user (i.e., the location of the mobile device) to any point on the horizontal plane. For example, display window 502 depicts a slightly tilted floor that reflects the visual data detected by the mobile device camera. Additionally, display window 502 further depicts a container 506 located on the floor. The AR framework can calculate the distance from the user (i.e., the location of the mobile device) to the point of the floor where container 506 rests. It is noted that a divider wall 508 is depicted in display window 502. The divider wall 508 is depicted because the mobile device camera captures its appearance. However, the AR environment does not automatically have information such as the position, rotation, and distance of the divider wall 508.

The AR frameworks may receive additional information to determine the position, rotation, and distance of vertical elements for representation in the AR environment. One element of the overlay includes a horizontal marker 504. The horizontal marker 504 allows the AR environment to receive user input indicating the location of a wall in the physical environment. In some embodiments, the horizontal marker 504 may be moved by using a touch screen interface of the display. The user may drag and drop the horizontal marker 504 to the desired location. The user may use the touch screen interface to move and rotate the horizontal marker 504 to match the line where the wall meets the floor in the AR environment. In other embodiments, the horizontal marker 504 may be a fixed point relative to the rest of display window 502. Instead of moving the horizontal marker 504, the user may move the horizontal marker 504 by shifting the aim of the mobile device camera. As the aim shifts, the AR environment depicted in display window 502 is updated to reflect the physical environment of the shifted aim. Meanwhile, the horizontal marker 504 remains fixed. The user can shift the virtual representation of the physical environment until the desired portion of the virtual representation is aligned with horizontal marker 504. Effectively, the user can aim the horizontal marker 504 such that it rests on the position where the wall meets the floor.

The horizontal marker 504 allows the user to mark the location where the divider wall 508 meets the floor. The AR environment can then determine the distance from the user to various points on the horizontal marker 504. In some embodiments, the distance of the horizontal marker 504 may be determined by using the ARKit™ framework for Apple iOS™ applications, ARCore™ framework for Google Android™ applications, and/or any other AR capable framework. The application may call application programming interface (API) functions of the AR frameworks to obtain distance information. As described above, the AR frameworks offers functionality for tracking the distance of any point on a horizontal plane. By calling API functions indicating the location marked by horizontal marker 504, the AR environment can determine the distance to the point on the floor where the horizontal marker 504 is located. Since the horizontal marker 504 is placed where the physical wall meets the floor, this distance information corresponds to the distance of the physical wall.

This distance information can be used to calculate the position, rotation, and distance of the horizontal marker 504. Since the horizontal marker 504 reflects the point on the floor where the divider wall 508 is located, the AR can utilize the distance information of the horizontal marker 504 as the distance information of the physical divider wall 508. Therefore, the horizontal marker 504 provides information that allows the AR environment to determine position, rotation, and distance of the divider wall 508. Using this information, the AR environment may generate a virtual wall that is placed in the same location as the divider wall 508. In some embodiments, the virtual wall is transparent such that it does not appear in the AR environment. While it is not visible, the virtual wall facilitates the placement of virtual artwork. Because the virtual wall is in the same location as the physical divider wall 508, any virtual artwork placed on the virtual wall will resemble the appearance of the virtual artwork on divider wall 508. Thus, the AR environment is able to simulate the appearance of the virtual wall on the detected divider wall 508.

The GUI 500 includes a place marker button 514 that places the horizontal marker 504 in the AR environment. The AR environment may also record the location of horizontal marker 504. The user may also press the back to tutorial button 512 to return to the previous screen. This may be used if the user desires to review the instructions provided by the initialization screen. In some embodiments, the initialization screen is implemented as GUI 400 as depicted in FIG. 4. Finally, the user may press the cancel button 516 to exit the AR configuration GUI 500.

Figure 6:
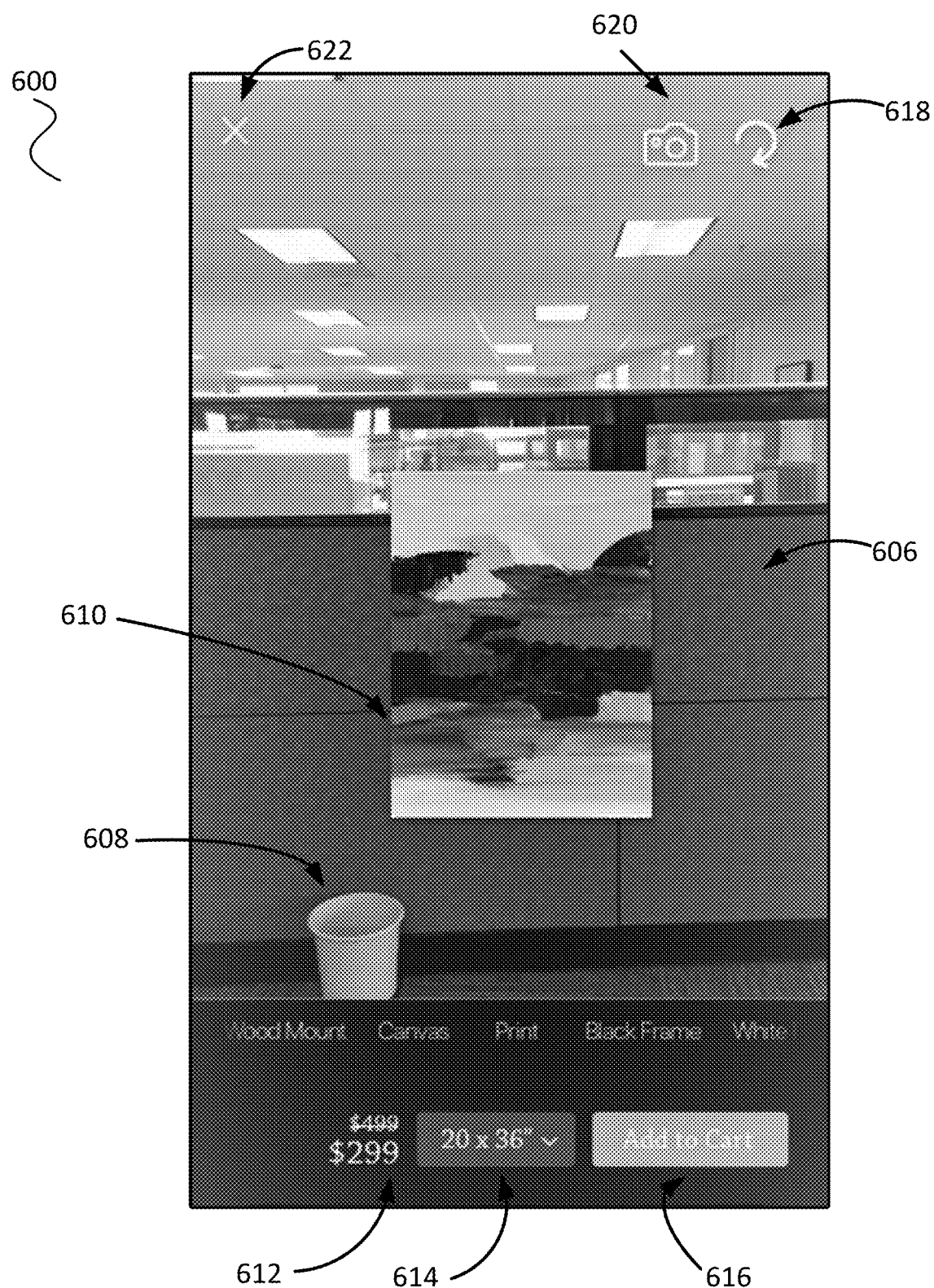
FIG. 6 is a diagram of a GUI for configuring the virtual artwork and facilitating the purchase of a physical copy of the virtual artwork according to some embodiments of the present disclosure.

FIG. 6 is a diagram of GUI 600 for configuring the virtual artwork in the AR environment and facilitating the purchase of a physical copy of the virtual artwork according to some embodiments of the present disclosure. In some embodiments, GUI 600 may be implemented as a mobile application running on mobile device 102. Mobile device 102 enables various user inputs. In some embodiments, display 104 may be a touch screen that receives user's taps, swipes, and other gestures. The user may swipe the virtual artwork 610 to adjust its location. Additionally, the user may pinch the virtual artwork 610 to adjust its size. Those skilled in the art will recognize that GUI 600 may be configured with some or all of the control elements described herein to facilitate various adjustments such as changing the placement of the artwork, the size of the artwork, the framing of the artwork, and the selection of the artwork. In some embodiments, GUI 600 allows for the configuration and adjustment of more than one piece of artwork. For example, GUI 600 may simulate a wall with a plurality of artworks on display. The adjustments may be made to individual artworks or to all of the artworks on the wall.

The user may tap various visual control elements on display 104. In some embodiments, the visual control elements allow users to make various selections for ordering a physical copy of the selected artwork represented by the virtual artwork 610. For example, the user may tap the price control element 612 to select a pricing option. In some embodiments, tapping the price control element 612 reveals different pricing options for the physical copy of the selected artwork based upon size, framing, print quality, etc. Additionally, the user may select a size control element 614 to select a desired size for the physical copy of the selected artwork. In some embodiments, tapping the size control element 614 reveals various sizing options for the selected artwork. For example, the options may reflect the various pre-set sizes available for the selected artwork, or reveal a prompt for the user to input a desired custom size. Once a desired size is selected, the AR environment will be updated such that virtual artwork 610 accurately reflects the selected size of the artwork in relation to the other elements of the AR environment. The user may also tap a purchase control element 618 to purchase the virtual artwork 610 in the size selected using size control element 614. Finally, the display may include orientation control element 618 for adjusting the orientation of the display, snapshot control element 620 for taking a snapshot of the AR environment shown on display 104, and exit control element 622 for exiting GUI 600. Besides the display 104, user input may be received from hardware buttons for implementing the functionality described above, or for implementing additional functionality. In some embodiments, additional inputs such as sound commands or facial recognition may be used to interact with the AR environment.

Figure 7:
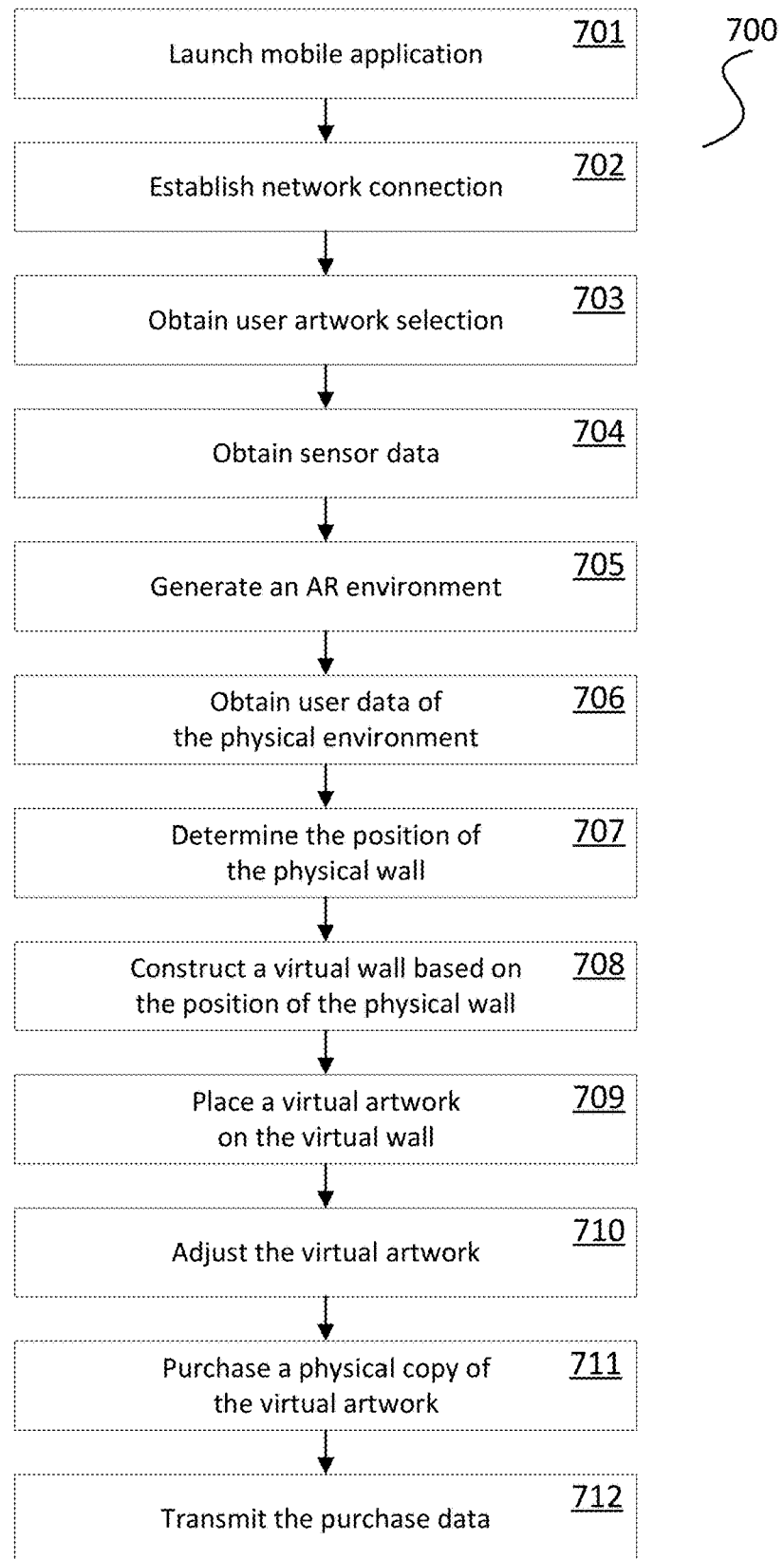
FIG. 7 is a flow diagram of a process for providing an AR environment that simulates artwork placed on a wall and facilitates the selection, modification, and purchase of a physical copy of the virtual artwork according to some embodiments of the present disclosure.

FIG. 7 depicts a flow diagram of process 700 for providing an AR environment that simulates artwork placed on a wall and facilitates the selection, modification, and purchase of a physical copy of the virtual artwork. In some embodiments, process 700 may be performed on mobile device 102 that includes various sensors including a camera.

In step 701, an application that facilitates an AR environment is launched on the mobile device 102. Although the embodiment described herein pertains to a mobile device having a camera, those skilled in the art will recognize that similar steps can be performed using other types of computing devices and/or sensors. In some embodiments, the AR environment is provided by a mobile application configured to use AR frameworks. For example, the mobile application can use the ARKit™ framework, ARCore™ framework, and/or any other AR capable framework. In other embodiments, the process may proceed as a built in feature of the mobile device without the need to launch a dedicated application.

In step 702, process 700 establishes a communication link between the mobile device and a network-connected server. The communication link may be used to transmit artwork information from the server to the mobile device, transmit AR environment information from the mobile device to the server, or transmit any data that may be shared between the mobile device and server.

In step 703, process 700 obtains data indicative of artwork selected by the user in an artwork selection mode for simulation in the AR environment. In some embodiments, the user may browse artwork information received from the server. In some embodiments, the artwork selection may be facilitated by selection GUI 300 of FIG. 3.

In step 704, process 700 obtains sensor data indicating a physical environment. In some embodiments, the mobile device 102 may include sensors such as a microphone, motion sensor, light sensor, camera or other optical sensor. In some embodiments, the sensor data is a stream of continuous data that provides a real-time indication of the physical environment. In some embodiments, the sensor data may be processed by the AR frameworks such as the ARKit™ framework, ARCore™ framework, and/or any other AR capable frameworks to analyze the physical environment.

In step 705, the obtained sensor data is used to generate an AR environment. The AR environment includes a virtual representation of the physical properties detected by the mobile device sensors. In some embodiments, the AR environment is updated continuously based upon the stream of sensor data. This allows the AR environment to function as a real-time representation of the physical environment. In some embodiments, the AR environment may be generated and updated using AR frameworks such as the ARKit™ framework, ARCore™ framework, and/or any other AR capable framework.

In step 706, process 700 obtains user input data indicative of the physical environment. In some embodiments, the user data indicates the location of a physical element such as a wall. In some embodiments, the user data is obtained using a horizontal marker 504 provided in GUI 500 of FIG. 5. As described with respect to FIG. 5, the horizontal marker 504 may be placed on a location indicating where a physical wall meets a physical floor. In some embodiments, the user data may be obtained using AR frameworks such as the ARKit™ framework, ARCore™ framework, and/or any other AR capable framework.

In step 707, process 700 determines the position of the physical wall based on the user input data indicative of the physical environment. As described with respect to FIG. 5, the user input data may include a horizontal marker 504. The horizontal marker 504 allows the user to mark the location where the divider wall 508 meets the floor. In some embodiments, the distance of the horizontal marker 504 may be determined by using the ARKit™ framework for Apple iOS™ applications, ARCore™ framework for Google Android™ applications, and/or any other AR capable frameworks. The AR frameworks offers functionality for tracking the distance of any point on a horizontal plane. The application may call application programming interface (API) functions of the AR frameworks to obtain distance information. By calling API functions indicating the location marked by horizontal marker 504, the AR framework returns data indicating the distance to the point on the floor where the horizontal marker 504 is located. Since the horizontal marker 504 is placed where the physical wall meets the floor, this distance information corresponds to the distance of the physical wall.

In step 708, process 700 constructs a virtual wall in the AR environment based upon the calculated location of the physical wall. In some embodiments, the virtual wall is transparent and occupies the same position as the physical wall. The virtual wall provides a structure within the AR environment that allows virtual elements such as artwork to be placed.

In step 709, a virtual artwork is placed on the virtual wall in the AR environment. As noted above, the virtual wall is constructed and occupies the same position as the physical wall, yet remains transparent. Therefore, while the virtual artwork may be placed on the virtual wall, it will appear to the user of the AR environment that the virtual artwork is placed on the physical wall. In some embodiments, the virtual artwork is artwork that the user selected in step 703.

In step 710, process 700 allows the user to adjust the virtual artwork placed on the virtual wall. In some embodiments, the adjustments may be performed in GUI 600 of FIG. 6. The adjustments may include changing the placement of the artwork, the size of the artwork, or the selection of the artwork. Additionally, the frame of the artwork and the texture of the print may be adjusted for simulation in the AR environment. Finally, the user may walk around in the physical space to change the perspective of the artwork. For instance, the user may walk to the back of the room to view the virtual artwork within the entire virtual room simulated by the AR environment. As the user walks around the physical space, the camera on the mobile device continually provides updated visual data. Therefore, the AR environment can use the stream of visual data to update the representation of the physical space in real-time.

In step 711, the user may purchase a physical copy of the simulated artwork. The purchase may be facilitated by GUI 600 of FIG. 6 which provides assorted options and information to allow the user to complete a purchase. The options may include the various adjustments such as the size, framing, etc. selected during step 710.

In step 712, the user artwork purchase data is transmitted to the network server from the mobile device for processing and fulfillment. The artwork purchase data may include the artwork selected in step 703. The artwork purchase data may also include options and accessories selected in the step 711. Finally, the purchase data may include user address information, shipping option information, and user payment information.

Figure 8:
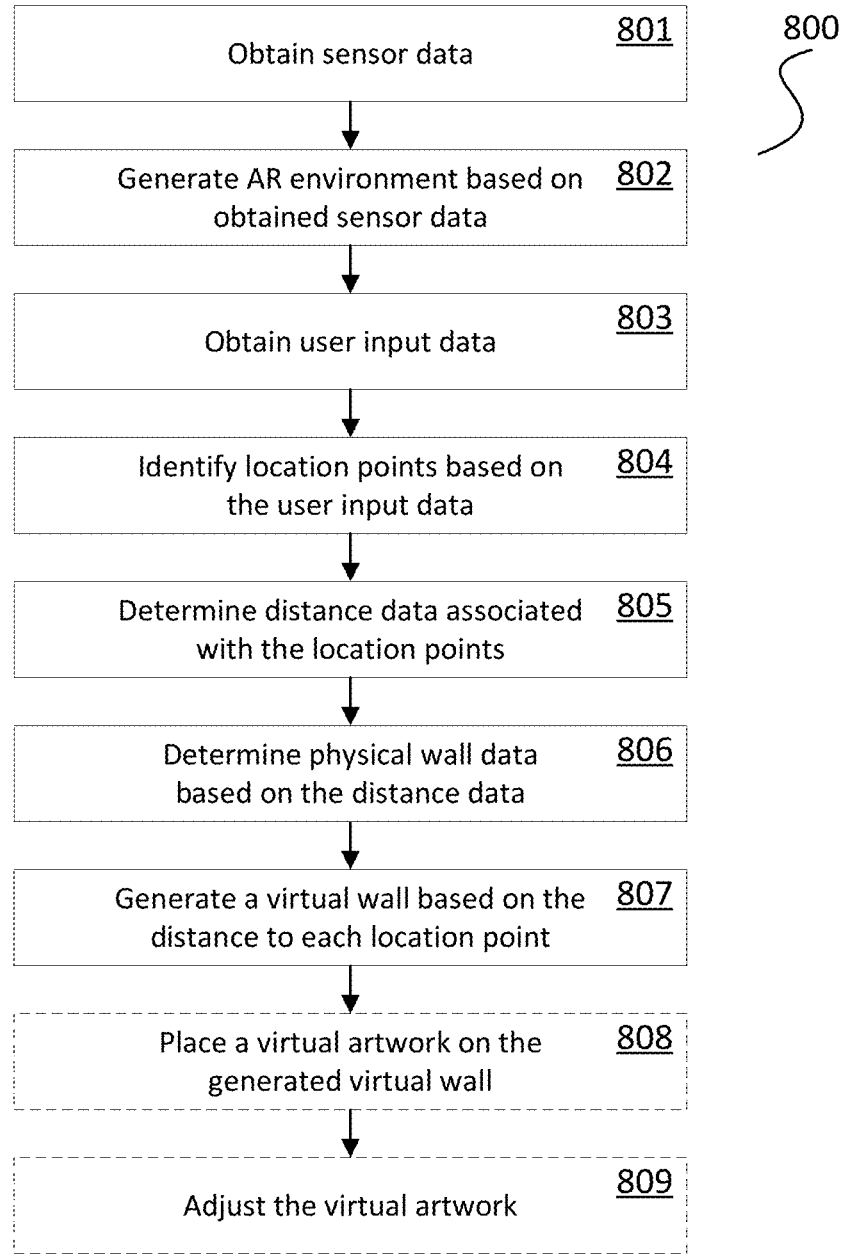
FIG. 8 is a flow diagram of a process for obtaining data indicative of the physical environment, generating a virtual wall corresponding to a detected physical wall of the physical environment, and placing a virtual artwork on the virtual wall according to some embodiments of the present disclosure.

FIG. 8 depicts a flow diagram of process 800 for obtaining user input data indicative of the physical environment, generating a virtual wall corresponding to a detected physical wall of the physical environment, and placing a virtual artwork on the virtual wall. In some embodiments, process 800 may be performed on mobile device 102 that includes various sensors including a camera.

In step 801, process 800 obtains sensor data indicative of the physical environment. The sensor data may include data indicative of the position, topology, lighting, and other conditions of the environment. The sensor data may be obtained by one or more sensors including a microphone, motion sensor, light sensor, camera or any other sensor. The sensors may provide a continuous stream of sensor data to facilitate a real-time AR environment.

In step 802, process 800 generates an AR environment based on the sensor data obtained in step 801. For example, a camera on mobile device 102 may receive real-time image data of the environment. If the camera captures a physical floor and physical wall in the environment, then the floor and wall is represented in the AR environment. In some embodiments, the AR environment can reproduce the appearance of the floor and wall, but does not yet have physical characteristics of the wall. For example, the AR environment receives the image data showing the floor and wall but needs to determine the position, rotation, and/or distance of the wall.

In step 803, process 800 obtains user input by recording a horizontal marker placed by the user on the AR environment. The user may be instructed to place the horizontal marker on the line where the virtual wall meets the virtual floor in the AR environment. The horizontal marker allows the AR environment to receive user input indicating the location of a wall in the physical environment. The AR environment can then determine the distance from the user to various points on the horizontal marker. In some embodiments, the distance of the horizontal marker 504 may be determined by using the ARKit™ framework for Apple iOS™ applications, ARCore™ framework for Google Android™ applications, and/or any other AR capable framework. The AR frameworks offers functionality for tracking the distance of any point on a horizontal plane. By calling API functions indicating the location marked by horizontal marker, the AR environment can determine the distance to the point on the floor where the horizontal marker is located. Since the horizontal marker is placed where the physical wall meets the floor, this distance information corresponds to the distance of the physical wall.

In step 804, process 800 identifies location points based on the user input data. In particular, the location points indicate points along the horizontal marker. In some embodiments, location points may be identified at specific increments along the horizontal marker. In some embodiments, the application may be configured to determine a specified number of location points evenly divided along the horizontal marker. In other embodiments, the application may be configured to designate a location point at each incremental distance along the horizontal marker.

In step 805, process 800 determines distance data indicative of the distance from the mobile device 102 to the different points on the horizontal marker. In some embodiments, position data of the identified location points is provided to the ARKit™ framework for Apple iOS™ applications, ARCore™ framework for Google Android™ applications, and/or any other AR capable framework. The frameworks respond to the position data of the location points by returning the distance to each location point. In other words, the distance data indicates the distance between position of the user (i.e., the position of the mobile device camera) and the location point. The obtained distance information corresponds to the distance of the physical wall. Thus, the AR environment may use the obtained distance information to determine the distance between the mobile device and the different points where the wall meets the floor.

In step 806, process 800 determines physical wall data relating to the physical wall detected by the sensor data and represented in the AR environment. In other words, the AR environment determines physical wall data indicating the position, rotation (i.e., angle), and/or distance of the physical wall from the mobile device by using the distance of various points corresponding to where the wall meets the floor.

For example, the distance of each location point may be used to determine the rotation (i.e., angle of the wall relative to the user) of the physical wall. If the distance of a point on the left side of the wall is shorter than the distance of a point on the right side of the wall, then the AR environment can determine that the rotation (i.e., angle of the wall relative to the user) of the wall is rotated such that the left size is closer to the mobile device. However, if the distance of the various points equidistant from the center of the horizontal marker are equal, then the wall is centered and perpendicular to the user's line of sight. In other words, the rotation of the wall is determined by comparing the values of the distance of the location points along the horizontal marker.

Similarly, the distance of each location point may be used to determine the position of the physical wall. As described above, the distance data indicates the distance between position of the user (i.e., the position of the mobile device camera) and the location point. By using the user (i.e., the mobile device) as a point of reference, the position of the physical wall can be determined. For example, if the distance data indicates that the location points are 10 feet from the user, then the position of the physical wall is determined to be 10 feet from the user. In other words, the AR environment can pair the determined location points with the distance associated with the corresponding location point to determine the distance that various points of the physical wall are from the user. A person of ordinary skill in the art will appreciate that the position of the wall can be determined at any distance where the AR frameworks can provide distance data and that the distance may be indicated by any unit of measurement indicating distance.

In step 807, process 800 generates a virtual wall using the determined position, rotation (i.e., angle), and distance information. By using the determined position, rotation, and distance data, the virtual wall corresponds to the same position as the physical wall captured by the camera. In some embodiments, the wall may be transparent. Thus, the appearance of the physical call captured by the camera is not affected by the virtual wall.

In step 808, process 800 places a virtual artwork on the virtual wall. Since the virtual wall is in the same location as the detected physical wall, placing an artwork on the virtual wall simulates placing the artwork on the physical wall. In step 809, process 800 may also allow the virtual artwork to be adjusted. Adjustments may include resizing the artwork, changing the position of the artwork, or changing accessories such as the frame or print material.

A person of ordinary skill in the art may recognize that process 800 may be configured with addition steps, repetition of certain steps, or the rearrangement of the various steps to facilitate the obtaining data indicative of the physical environment, generating a virtual wall corresponding to a detected physical wall of the physical environment, and placing a virtual artwork on the virtual wall.

Networking System

Figure 9:
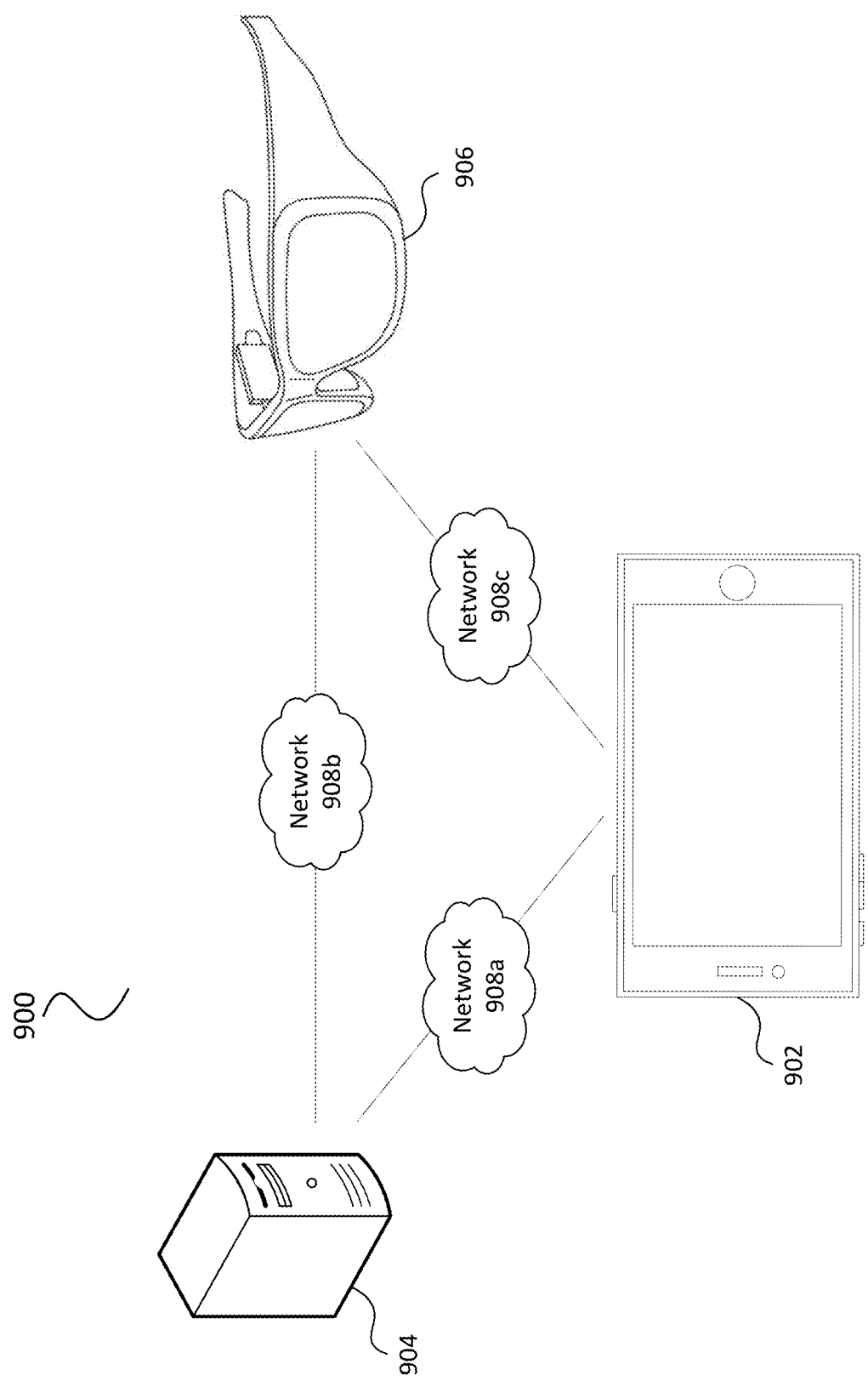
FIG. 9 is an example of a network environment that includes a mobile device and a network-accessible server system according to some embodiments of the present disclosure.

FIG. 9 depicts an example of a network environment 900 that includes a mobile device 902 having an application configured to present AR environments and a network-accessible server system 904 responsible for supporting the application. In one embodiment, the network environment 900 will only include the mobile device 902 and the network-accessible server system 904. However, in some embodiments the network environment 900 also includes another computing device 906 (e.g., a head-mounted device) in addition to, or instead of, the mobile device 902.

While many of the embodiments described herein involve mobile devices, those skilled in the art will recognize that such embodiments have been selected for the purpose of illustration only. The technology could be used in combination with any computing device that is able to present augmented reality content, including personal computers, tablet computers, personal digital assistants (PDAs), game consoles (e.g., Sony PlayStation™ or Microsoft Xbox™), music players (e.g., Apple iPod Touch™), wearable electronic devices (e.g., watches or fitness bands), network-connected ("smart") devices (e.g., televisions and home assistant devices), virtual/augmented reality systems (e.g., head-mounted displays such as Oculus Rift™ and Microsoft HoloLens™), or other electronic devices. For example, the augmented reality feature(s) may be created responsive to instructions generated by the head-mounted display or another computing device to which the head-mounted display is communicatively coupled. Similarly, an application residing on a mobile device 902 may generate instructions for creating the augmented reality environment and transmit those instructions to the head-mounted display. As another example, a network-connected server system 904 may generate instructions for creating the augmented reality feature(s) and transmit those instructions to the mobile device 902 or the head-mounted display.

Accordingly, the mobile device 902, the network-connected server system 904, and/or the other computing device 906 can be connected via one or more computer networks 908a-c, which may include the Internet, local area networks (LANs), wide-area networks (WANs), metropolitan area networks (MANs), cellular networks (e.g., LTE, 3G, 4G), etc. Additionally or alternatively, the mobile device 902, the network-connected server system 904, and/or the other computing device 906 may communicate with one another over a short-range communication protocol, such as Bluetooth™, Near Field Communication (NFC), radio-frequency identification (RFID), etc.

Generally, an application executing on the mobile device 902 is responsible for generating and presenting augmented reality elements to an individual. The network-connected server system 904 and/or the other computing device 906 can be coupled to the mobile device 902 via a wired channel or a wireless channel. In some embodiments, the network-accessible server system 904 is responsible for delivering augmented reality assets (e.g., markers, textures, animation instructions, audio files) to the mobile device 902, while in other embodiments the mobile device 902 stores some or all of the augmented reality assets locally (e.g., within a memory). Therefore, in some instances the mobile device 902 may execute the techniques described herein without needing to be communicatively coupled to any network(s), other computing devices, etc.

Processing System

Figure 10:
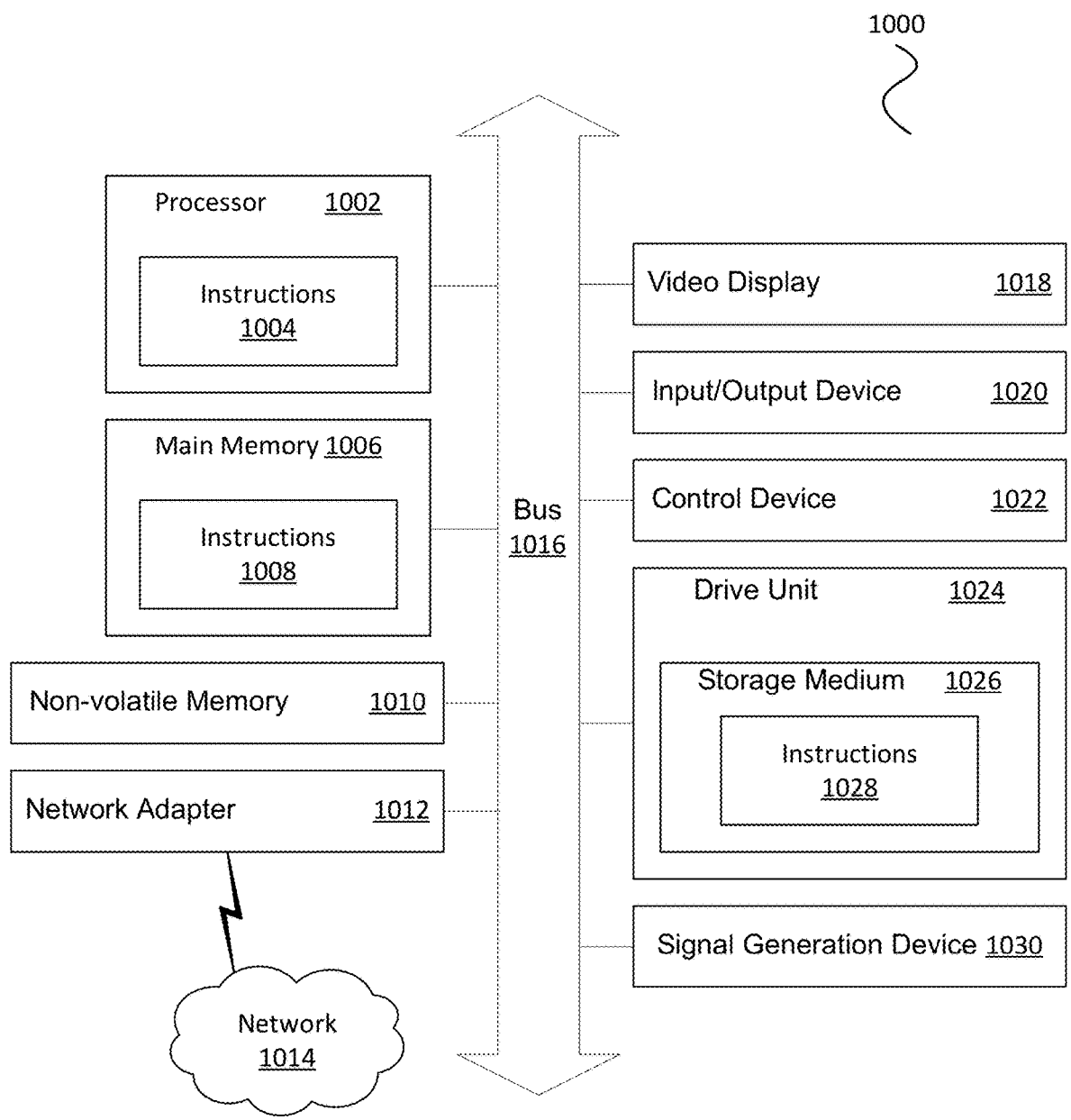
FIG. 10 is a block diagram illustrating an example of a processing system in which at least some operations described herein can be implemented.

FIG. 10 is a block diagram illustrating an example of a processing system 1000 in which at least some operations described herein can be implemented. The processing system may include one or more central processing units ("processors") 1002, main memory 1006, non-volatile memory 1010, network adapter 1012 (e.g., network interfaces), video display 1018, input/output devices 1020, control device 1022 (e.g., keyboard and pointing devices), drive unit 1024 including a storage medium 1026, and signal generation device 1030 that are communicatively connected to a bus 1016.

The bus 1016 is illustrated as an abstraction that represents one or more physical buses and/or point-to-point connections that are connected by appropriate bridges, adapters, or controllers. Therefore, the bus 1016 can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

In some embodiments the processing system 1000 operates as part of a mobile device that executes an application configured to generate augmented reality features, while in other embodiments the processing system 1000 is connected (wired or wirelessly) to the mobile device. In a networked deployment, the processing system 1000 may operate in the capacity of a server or a client machine in a client-server network environment, or as a peer machine in a peer-to-peer network environment. The processing system 1000 may be a server, a personal computer (PC), a tablet computer, a laptop computer, a personal digital assistant (PDA), a mobile device, a processor, a telephone, a web appliance, a network router, a switch, a bridge, a console, a gaming device, a music player, or any machine capable of executing a set of instructions (sequential or otherwise) that specify actions to be taken by the processing system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized or distributed database and/or associated caches and servers) that store one or more sets of instructions 1028. The term "machine-readable medium" and "storage medium" shall also be taken to include any medium that is capable of storing, encoding, or carrying a set of instructions for execution by the processing system 1000.

In general, the routines executed to implement the embodiments of the disclosure may be implemented as part of an operating system or a specific application, component, program, object, module or sequence of instructions referred to as "computer programs." The computer programs typically comprise one or more instructions (e.g., instructions 1004, 1008, 1028) set at various times in various memory and storage devices in a computing device, and that, when read and executed by the one or more processors 1002, cause the processing system 1000 to perform operations to execute elements involving the various aspects of the technology.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include, but are not limited to, recordable-type media such as volatile and non-volatile memory devices 1010, floppy and other removable disks, hard disk drives, optical disks (e.g., Compact Disk Read-Only Memory (CD ROMS), Digital Versatile Disks (DVDs)), and transmission-type media such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1012 can include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of, for example, one or more application-specific integrated circuits (ASICs), programmable logic devices (PLDs), field-programmable gate arrays (FPGAs), etc.

What is claimed is:

1. A method for generating a virtual wall in an augmented reality (AR) environment to simulate art displays, the method comprising:
    launching an application on a mobile device that includes a camera;
    establishing, by the application, a network connection between the mobile device and a network-connected server system responsible for supporting the application;
    obtaining, by the application, selection data indicative of a user selected artwork;
    obtaining, by the application, sensor data including a stream of visual data of the physical environment from the camera;
    generating, by the application, the AR environment updated in real-time based at least in part on the stream of visual data;
    obtaining, by the application, user input data including a position of a single horizontal marker positioned by the user in the AR environment indicating the location where a representation of a physical wall meets a representation of a physical floor in the AR environment, wherein the user input data includes touch screen input indicating the position where a user positioned the single horizontal marker using a drag-and-drop gesture;
    calculating distance data to the single horizontal marker relative to the mobile device based on the user input data;
    determining, by the application, the position of the physical wall based on the calculated distance data;
    constructing, by the application, a virtual wall based on the position of the physical wall;
    placing, by the application, a virtual artwork representative of the user selected artwork on the virtual wall;
    adjusting, by the application, characteristics of the virtual artwork, the adjusting including changing a perspective of the virtual artwork in real time based on the stream of visual data for the location of the user within the physical environment;
    purchasing, by the application, a physical copy of the virtual artwork; and
    transmitting, by the application, purchase data indicative of the purchase.

2. The method of claim 1, wherein the position of the physical wall is determined using functionality provided by an AR application programming interface.

3. The method of claim 1, wherein the user selected artwork is selected from among artwork data provided by the network-connected server system.

4. A method for generating a virtual wall in an augmented reality (AR) environment, the method comprising:
    obtaining, by a processor, sensor data indicative of a physical environment;
    generating, by the processor, the AR environment in real-time based on the sensor data;
    obtaining, by the processor, user input data including a position of a single horizontal marker indicative of where a physical wall meets a physical floor wherein the user input data includes touch screen input indicating the position where a user positioned the single horizontal marker using a drag-and-drop gesture;
    identifying, by the processor, location points along the single horizontal marker;
    calculating, by the processor, distance data associated with the location points along the single horizontal marker relative to a user device that facilitates the touch screen input;
    determining, by the processor, physical wall data indicating the distance, angle, and/or position of the physical wall based on the calculated distance data;
    generating, by the processor, a virtual wall based upon the physical wall data; and
    changing a perspective of the virtual wall in real time based on the sensor data for the location of the user within the physical environment.

5. The method of claim 4, wherein the single horizontal marker is positioned by the user in the AR environment to indicate the location where a representation of the physical wall meets a representation of the physical floor in the AR environment.

6. The method of claim 4, wherein the processor is located on a mobile device that includes a camera for capturing the sensor data.

7. The method of claim 6, wherein the distance data indicates the distance between the location points and the mobile device.

8. The method of claim 7, wherein when the physical wall data indicates angle of the physical wall, the angle of the physical wall is determined by comparing the distance data of the location points.

9. The method of claim 7, wherein the position of the physical wall is determined by using the distance data to determine the position of the location points relative to the location of the mobile device.

10. The method of claim 7, wherein the distance data of the location points is obtained using functionality provided by an AR application programming interface.

11. A computer system comprising:
    a processor operable to execute instructions stored in a memory; and
    instructions stored in the memory for generating a virtual wall in an augmented reality (AR) environment, wherein execution of the instructions causes the processor to:
       obtain sensor data indicative of a physical environment;
       generate the AR environment in real-time based on the sensor data;
       obtain user input data including a position of a single horizontal marker indicative of where a physical wall meets a physical floor, wherein the user input data includes touch screen input indicating the position where a user positioned the single horizontal marker using a drag-and-drop gesture;
       identify location points along the single horizontal marker;
       calculate distance data associated with the location points along the single horizontal marker relative to a user device that facilitates the touch screen input;
       determine physical wall data indicating the distance, angle, and/or position of the physical wall based on the distance data;
       generate a virtual wall based upon the physical wall data; and
       change a perspective of the virtual wall in real time based on the sensor data for the location of the user within the physical environment.

12. A method for facilitating the purchase of artwork simulated in an augmented reality (AR) environment, the method comprising:
    displaying, on a mobile device, an artwork selection mode for obtaining an artwork selection;
    displaying, on the mobile device, an instruction mode with instructions to configure the AR environment on the mobile device display;
    displaying, on the mobile device, a configuration mode for displaying the AR environment in real-time and obtaining user input data indicative of a position of a single horizontal marker representing where an AR representation of a physical wall meets an AR representation of a physical floor in the AR environment, wherein the user input data includes touch screen input indicating the position where a user positioned the single horizontal marker using a drag-and-drop gesture;
    calculating distance data to the single horizontal marker relative to the mobile device based on the user input data; and
    displaying, on the mobile device, a purchase mode for viewing the artwork simulated in the AR environment on a virtual wall determined by the calculated distance data and obtaining purchase data indicative of a purchase of the artwork, the purchase mode configured to display a changed perspective of the virtual artwork in real time based on the user input data for the location of the user.

13. The method of claim 12, wherein the artwork selection indicates one or more artworks selected by the user of the mobile device.

14. The method of claim 12, wherein the artwork selection is selected from among artwork data provided by a server connected to the mobile device.

15. The method of claim 12, wherein the purchase data is transmitted to a server connected to the mobile device for processing and order fulfillment.

* * * * *